(12) United States Patent
Muth

(10) Patent No.: US 8,470,182 B2
(45) Date of Patent: Jun. 25, 2013

(54) APPARATUS AND METHOD FOR HYDROLYZING BIOLOGICAL MATERIAL

(75) Inventor: Mark R. Muth, Wellington, CO (US)

(73) Assignee: Gyver L. Electric, Inc., Wellington, CO (US)

( * ) Notice: Subject to any disclaimer, the term of this patent is extended or adjusted under 35 U.S.C. 154(b) by 0 days.

(21) Appl. No.: 13/306,833

(22) Filed: Nov. 29, 2011

(65) Prior Publication Data

US 2012/0136193 A1    May 31, 2012

Related U.S. Application Data

(62) Division of application No. 12/139,481, filed on Jun. 15, 2008, now Pat. No. 8,066,953.

(51) Int. Cl.
*C02F 1/68* (2006.01)
*A62D 3/35* (2007.01)

(52) U.S. Cl.
USPC ............ 210/749; 210/773; 210/774; 241/17; 241/20; 422/198; 422/224; 588/317; 588/318; 588/405

(58) Field of Classification Search
USPC ................ 210/739, 749, 757, 766, 770, 773, 210/774, 806, 175, 177, 180, 205, 206; 241/17, 241/20, 23, 24.11, 38; 422/198, 224, 225, 422/226, 184.1, 202, 203, 208, 242; 588/300, 588/312, 318, 319, 400, 249, 317, 405
See application file for complete search history.

(56) References Cited

U.S. PATENT DOCUMENTS

| 2,029,648 | A | * | 2/1936 | Austin ............................... 71/12 |
| 2,280,129 | A | * | 4/1942 | Reinders-Folmer .............. 71/18 |
| 3,233,980 | A | * | 2/1966 | Fox et al. ...................... 422/225 |
| 3,253,007 | A | * | 5/1966 | Lunde .......................... 554/160 |
| 3,752,447 | A | * | 8/1973 | Chen .......................... 366/328.4 |
| 5,422,074 | A | * | 6/1995 | Schmidt ......................... 422/28 |
| 6,437,211 | B2 | * | 8/2002 | Kaye et al. .................... 588/318 |
| 6,472,580 | B2 | * | 10/2002 | Kaye et al. .................... 588/317 |
| 2001/0009969 | A1 | * | 7/2001 | Kaye et al. .................... 588/205 |
| 2005/0175516 | A1 | * | 8/2005 | Grobler et al. ............. 422/184.1 |
| 2006/0222574 | A1 | * | 10/2006 | Kaye et al. ................. 422/184.1 |
| 2006/0247485 | A1 | * | 11/2006 | Wilson et al. ................. 588/299 |
| 2007/0197852 | A1 | * | 8/2007 | Wilson et al. ................. 588/318 |

* cited by examiner

*Primary Examiner* — Joseph Drodge
(74) *Attorney, Agent, or Firm* — Samuel M. Freund; Cochran Freund & Young LLC

(57) ABSTRACT

Apparatus and method for hydrolyzing biological material for safe disposal thereof without the necessity of incineration or use of disinfectants are described. An alkaline solution having a concentration and an amount effective for hydrolyzing the biological material is brought into contact therewith by means of rotating paddles which both pound the biological material into small pieces and thoroughly mix the alkaline solution with the material under pressure and at elevated temperature. Following the hydrolysis of the biological material, a chosen portion of the water is removed from the alkaline solution and from the liquefied biological material, such that the resulting product solidifies when cooled. The present safe disposal of the biological material does not require incineration thereof, the addition of disinfectants thereto, or the discharge of liquid effluent containing processed biological material into the sewage system.

9 Claims, 1 Drawing Sheet

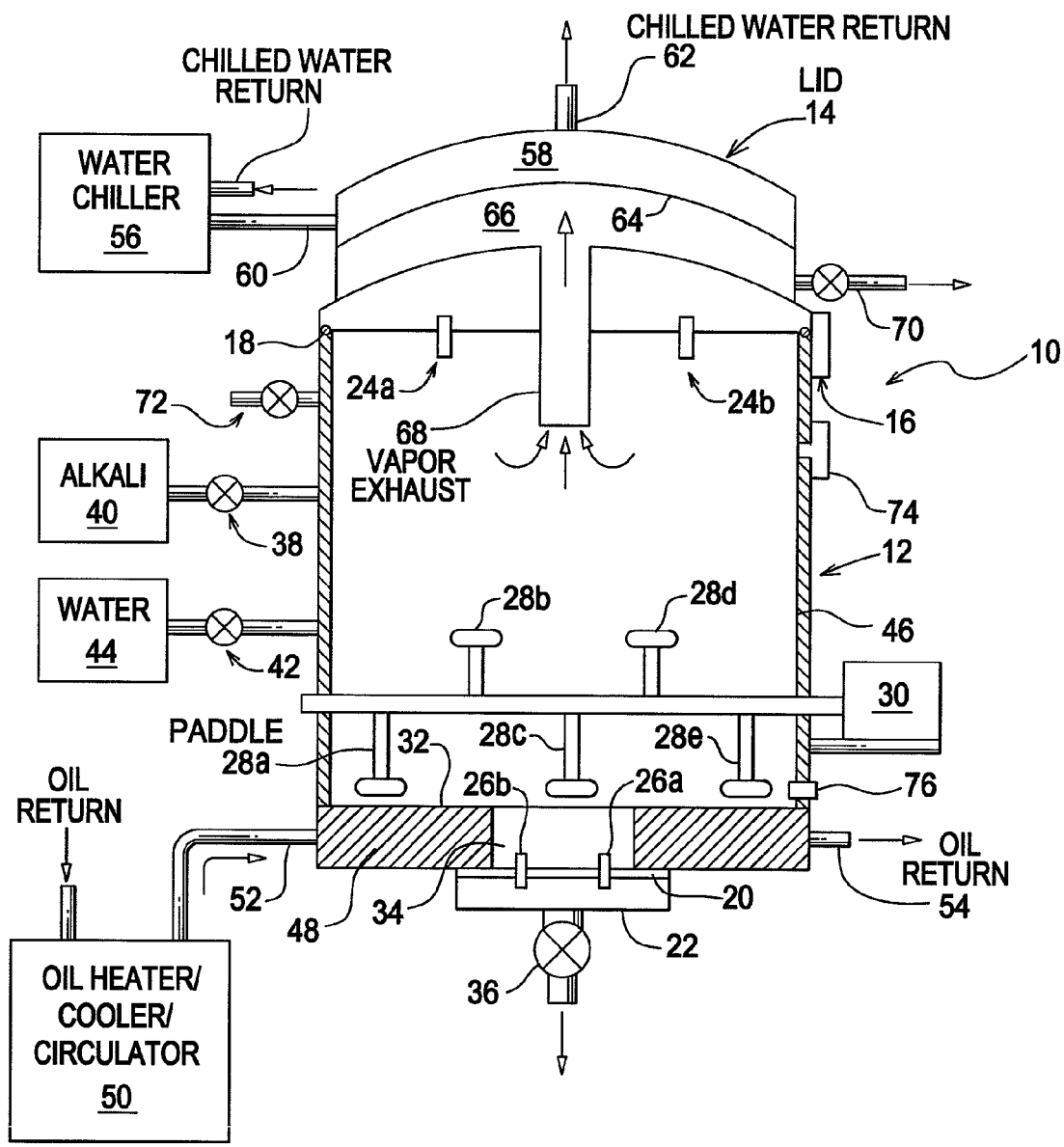

US 8,470,182 B2

APPARATUS AND METHOD FOR HYDROLYZING BIOLOGICAL MATERIAL

CROSS-REFERENCE TO RELATED APPLICATION

This application is a divisional application of U.S. patent application Ser. No. 12/139,481, now U.S. Pat. No. 8,066,953 entitled "Apparatus and Method for Hydrolizing Biological Material," filed Jun. 15, 2008, by Mark R. Muth. The entire content of the above mentioned application is hereby specifically incorporated herein by reference for all that it discloses and teaches.

FIELD OF THE INVENTION

The present invention relates generally to alkaline hydrolysis of carcasses and, more particularly, to the use of a heated, pressurized alkaline hydrolysis for generating a solid hydrolysis product from biological material.

BACKGROUND OF THE INVENTION

Disposal of animal carcasses and other biological waste material is generally accomplished by sterilization/burial or incineration. Burial procedures suffer from the obvious difficulties involved with vanishing waste disposal sites, odor and potential for release of pathogenic materials from incomplete sterilization or decontamination processes. Incineration provides significant volume reduction (up to 97%), but toxins and heavy metals may be concentrated in the incinerator ash, producing toxic waste. Toxins, including dioxins, halogenated hydrocarbons, and mercury vapor are produced by the combustion process and may be released into the atmosphere since incineration of biological materials currently does not require scrubbers for treatment of effluent gases. Destruction of pathogens by incineration may not be complete since combustion may not be uniform.

SUMMARY OF THE INVENTION

Accordingly, it is an object of the present invention to provide an apparatus and method for disposing of biological materials.

Another object of the invention is to provide an apparatus and method for safe disposal of biological materials.

Yet another object of the invention is to provide an apparatus and method for safe disposal of biological materials without incineration thereof.

Still another object of the invention is to provide an apparatus and method for safe disposal of biological materials without the use of disinfectants.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for hydrolyzing biological material, hereof, includes in combination: a chamber capable of being pressurized and having at least one sealable port for receiving the biological material; means for introducing a chosen quantity of alkali into the chamber; means for introducing water into the chamber in an amount sufficient for forming a solution of the alkali effective for reacting with said biological material and for contacting a portion of said biological material; at least one rotating paddle for pounding the biological material into small pieces and for intimately mixing the small pieces of the biological material with the alkaline solution such that the biological material is liquefied; a heater for bringing the solution and the biological material to a chosen temperature effective for maintaining a boiling condition therein; means for maintaining the chamber at a chosen pressure greater than atmospheric pressure; means for extracting a chosen quantity of water from the alkaline solution and the liquefied biological material; and means for cooling the resulting alkaline solution and the liquefied biological material, whereby a solid mass (biomass) is formed.

In another aspect of the invention, and in accordance with its objects and purposes, the method for hydrolyzing biological material, hereof, includes the steps of: contacting a portion of the biological material with a chosen quantity of alkaline solution having a concentration effective for reacting with the biological material; heating the solution and the biological material to a chosen temperature effective for maintaining a boiling condition in the solution; pressurizing the solution and the biological material to a chosen pressure; pounding the biological material such that the biological material is shredded and the shredded portions intimately mixed with the alkaline solution, whereby the biological material is liquefied; removing a chosen amount of the water from the liquefied biological material and alkaline solution; and cooling the resulting alkaline solution and liquefied biological material and alkaline solution, whereby a solid is formed.

Benefits and advantages of the present invention include, but are not limited to, providing an apparatus and method for hydrolyzing biological material for safe disposal thereof in solid form without requiring incineration, addition of disinfectants, or discharging liquid effluent containing processed biological material into the sewage system. The resulting solid material is suitable for use as fuel, compost or as landfill, while the liquid recovered from the removal of water from the biological material may be reused in the hydrolysis of additional biological material or as a composting additive due to its elevated pH.

BRIEF DESCRIPTION OF THE DRAWING

The accompanying drawing, which is incorporated in and forms a part of the specification, illustrates an embodiment of the apparatus of the present invention and, together with the description, serves to explain the principles of the invention:

The FIGURE is a schematic representation of one embodiment of the apparatus hereof for hydrolyzing biological material showing, in particular, a chamber for containing the biological material and a solution of alkali, and capable of being pressurized, rotary paddles for pounding the biological material into small pieces and mixing the minced biological material with the alkaline solution, walls adapted to be heated and cooled using oil as the conducting medium, and a condensation cover lid for removing a portion of the water from the alkaline solution and the biological material, and for adding biological material to the chamber.

DETAILED DESCRIPTION OF THE INVENTION

Briefly, the present invention includes apparatus and method for hydrolyzing biological material for safe disposal thereof without the necessity of incineration or use of disinfectants are described. An alkaline solution having a concentration and an amount effective for hydrolyzing the biological material is brought into contact with the material by means of rotating paddles which both pound or beat the biological material into small pieces and thoroughly mix the alkaline solution with the material under pressure and at elevated temperature. After the hydrolysis of the biological material, a chosen portion of the water is removed from the alkaline solution and from the liquefied biological material, such that the resulting product solidifies when cooled. Because of the use of the paddles for intimately mixing the beaten biological with the alkaline solution, considerably less water and alkali material is required than with other methods. The water already present in the biological material constitutes part of the total water introduced into the chamber, making it unnecessary to submerge the biological material.

The total quantity and concentration of the added alkaline solution are selected such that when the water in the biological material is included, the resulting solution is effective for hydrolyzing the biological material for safe disposal. The concentration of the added solution is higher than the ultimate solution as the alkali is consumed in the hydrolysis process, and water is released from the biological material. The biological material quickly softens under the action of the heated alkaline solution, rendering it readily dismembered by the action of the paddles which action is begun once the biological material is partially softened by hydrolysis.

In what follows, the term "biological material" includes, but is not limited to, animal carcasses either intact or in pieces, bacteria, viruses, prions, and other pathogens, and plant material. Liquefaction of biological material, as used herein, means dissolving soluble portions of the treated biological material in the alkaline solution, emulsifying immiscible liquid portions of the treated biological material with the alkaline solution, and suspending insoluble solid portions of the biological material, such as bones, as an example, in the alkaline solution, while liquefied biological material, as used herein, means dissolved soluble portions of the treated biological material in the alkaline solution, emulsified immiscible liquid portions of the treated biological material with the alkaline solution, and suspended insoluble solid portions of the biological material, such as bones, as an example, in the alkaline solution.

As stated hereinabove, the resulting solid material is suitable for use as fuel, compost or as landfill, while the liquid recovered from the removal of water from the biological material may be reused in the hydrolysis of additional biological material, thereby saving alkali material, or as a composting additive or fertilizer supplement due to its elevated pH.

Reference will now be made in detail to the present embodiments of the invention, examples of which are illustrated in the accompanying drawing. Turning now to the FIGURE, a schematic representation of an embodiment of apparatus, 10, for hydrolyzing biological material, hereof, is illustrated. Processing chamber, 12, is adapted for receiving biological material (not shown in the FIGURE) through cover lid, 14, which is pivotably mounted to chamber 12 using hinge, 16. Additional functions of cover lid 14 will be set forth in detail hereinbelow, and other biological material input ports (not shown in the FIGURE) may be contemplated. O-ring, 18, located in cover lid 14, and gasket, 20, seal cover lid 14 and flange fitting, 22, to chamber 12, respectively, such that the interior of chamber 12 can be pressurized. Clamps or bolts, 24a and 24b, maintain cover lid 14 sealed, and clamps or bolts, 26a and 26b, maintain flanged fitting 22 sealed, respectively, when chamber 12 is pressurized, and permit the lid and the flange fitting to be opened for ready access to chamber 12 once processing of biological material has been completed. Clearly, a plurality of clamps or bolts 24a and 24b, and 26a and 26b would be spaced around the periphery of cover lid 14 or flange fitting 22, respectively, to achieve the requisite sealing capability. Processing chamber 12, cover lid 14 and flange fitting 22, may be fabricated from alkali-resistant materials such as stainless steel, as an example.

Rotatable paddles, 28a-28e, driven by motor, 30, extend close to bottom surface, 32, of chamber 12 which surface may be cylindrical in cross section, and are shaped and disposed such that liquids may be directed into depression, 34, of chamber 12 and drained through valved liquid drain, 36, which may be mounted on flange fitting 22. Once the biological material is softened by action of the heat and alkali, the paddles are used to pound the biological material into fine pieces and intimately mix the resulting pieces with the alkaline solution.

Alkali may be introduced into chamber 12 through valve, 38, from alkali supply, 40, while water may be added through valve, 42, from water supply, 44. Wall, 46, and base, 48, of chamber 12 are hollow such that flowing heated or cooled oil pumped by oil heater/cooler/circulator, 50, through inlet, 52, into chamber 12 and out through return, 54, may be used to heat or cool the contents of the chamber to a chosen temperature during processing of the biological waste for a selected time period. Steam, electricity or gas may be used to heat the oil (not shown in the FIGURE), while fresh water may be used to cool the oil (not shown in the FIGURE). Clearly, external coils (not shown in the FIGURE) may also be used for this function.

Water chiller, 56, provides cool flowing water to upper chamber, 58, of cover lid 14 through water entry port, 60. Water exit port, 62, returns the water to chiller 56. The flowing water has a chosen temperature effective for condensing steam and water droplets generated in chamber 12. Upper surface, 64, of lower chamber, 66, of cover lid 14 thereby condenses water droplets and steam passing through vapor exhaust pipe, 68, which opens into chamber 66 at one end and into chamber 12 at the other. The condensate collected in lower chamber 66 may be drained through valved water outlet, 70. Generally, water in the amount of about 50% of the initial weight of the biological material is removed during processing of the biological material. In the event that the quantity of water exceeds that which can be accommodated in lower chamber 66, a sealable chamber capable of being pressurized to the pressure within chamber 12 (not shown in the FIGURE) is attached through valve 70 to lower chamber 66 of cover lid 14, and the water collected in lower chamber 66 is permitted to flow into this chamber. The pH of the collected water was found to be about 9 which may be the result of some water droplets containing alkali also exiting the interior of chamber 12 through exhaust pipe 68 in addition to steam in vapor form.

Vent valve, 72, permits chamber 12 to be vented and, as will be described hereinbelow, is caused to remain open while the contents of chamber 12 are initially being heated, and may be vented through a HEPA filter (not shown in the FIGURE). Valve 72 is closed once the contents of chamber 12 reach between 160° F. and 180° F. Pressure is measured using pressure gauge, 74, which may be used in cooperation with valve 72 to permit rapid depressurization of chamber 12 in emergency situations. Temperature of the contents of chamber 12 is determined by temperature sensor, 76, which is disposed near the bottom of the chamber in order to contact any liquids present therein.

In operation, biological material is loaded into chamber 12 of apparatus 10 with cover lid 14 open. Cover lid 14 is then sealed by fastening clamps or bolts 24a and 24b. Alkali, such as sodium hydroxide, potassium hydroxide, or ammonium hydroxide, as examples, and mixtures thereof, is introduced through valve 38 from supply 40, and water is introduced through valve 42 from supply 44 to generate an alkaline solution effective for reacting with the biological material. As stated hereinabove, water removed from the alkaline solution and from the biological material during the processing thereof through valve 70 may be reintroduced into chamber 12 to reduce the quantity of alkali required. After addition of the alkali and water, the walls and base of chamber 12 are heated using flowing oil from heater/circulator 50 to a chosen temperature, between 250° F. and 400° F., as an example, the liquids in chamber 12 being permitted to boil under pressure. The biological material softens, generally between about 30 min. and 1 h, after the liquids in the chamber reach about 250° F., and the resistance to rotation of paddles 28a-28e is tested by measuring the current flowing through motor 30. Once the biological material has sufficiently softened to permit rotation of the paddles, the biological material is pounded into small pieces and intimately mixed the biological material with the alkali solution by the action of the paddles to increase the rate of reaction thereof. The biological material is processed between about 3 h and about 6 h to destroy infectious materials, and a chosen quantity of water is then extracted from the boiling alkali solution and the reacted biological material over a period of approximately 24 h through vapor exhaust pipe 68 and condensation cover lid 14 as a result of the boiling of the liquids in chamber 12, and the condensation of steam and water droplets reaching surface 64. Once a chosen amount of water has been extracted, the heated, circulating oil is cooled such that the reduced liquids may be safely discharged from chamber 12 through valve 36 in port cover 22 into an external container (not shown in the FIGURE). After further cooling, the discharged liquid solidifies. The resulting solid may be used as fuel or compost or disposed of as landfill material.

Having generally described the invention, the following EXAMPLE provides additional details:

EXAMPLE

Animal carcasses were hydrolyzed using between about 8% and about 15% of sodium hydroxide, and between approximately 12% and approximately 20% of water of the initial weight of the carcass at between about 275° F. and 400° F. (approximately 300° F. was used for the majority of the tests), for between approximately 3 h and about 6 h during which time period it is believed by the inventor that prions and other infectious species present in the biological material are destroyed. This corresponds to an initial concentration of greater than 1 M sodium hydroxide. Typically, 3 M sodium hydroxide is employed. After about 3 h of contact with the carcass, the pH of the alkaline solution is less than approximately 12 (typically, between about 11.1 and about 11.5) since a portion of the hydroxide reacts with the carcass and water in the biological material further dilutes the alkaline solution. The pressure inside chamber 12 was found to rise to between about 2 and approximately 4 atm. after liquid boiling commenced. After 24 h of processing and water removal, the remaining liquids were cooled, discharged and solidified into a solid mass having less than approximately 20% water therein and a pH of between about 9.1 and approximately 9.5.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for hydrolyzing biological material comprising the steps of:
    contacting a portion of the biological material with a chosen quantity of alkaline solution having a concentration effective for reacting with the biological material;
    heating the alkaline solution and the biological material to a chosen temperature effective for maintaining a boiling condition in the solution;
    pressurizing the alkaline solution and the biological material to a chosen pressure;
    pounding the biological material such that the biological material is shredded and the shredded portions intimately mixed with the alkaline solution, whereby the biological material is liquefied;
    removing a chosen amount of the water from the liquefied biological material and the alkaline solution; and
    cooling the resulting alkaline solution and liquefied biological material until it solidifies.

2. The method for hydrolyzing biological material of claim 1, wherein said step of pounding the biological material is performed using at least one rotating paddle.

3. The method for hydrolyzing biological material of claim 1, wherein the chosen temperature is greater than about 275° F.

4. The method for hydrolyzing biological material of claim 1, wherein the chosen pressure is greater than about 2 atmospheres.

5. The method for hydrolyzing biological material of claim 1, wherein said step of removing a chosen portion of the water from the liquefied biological material and the alkaline solution is achieved by condensing water as water vapor and water droplets emerging from the boiling alkaline solution and liquefied biological material on a cold surface.

6. The method for hydrolyzing biological material of claim 1, wherein the alkaline solution comprises hydroxide selected from the group consisting of sodium hydroxide, potassium hydroxide, ammonium hydroxide, and mixtures thereof.

7. The method for hydrolyzing biological material of claim 6, wherein the concentration of the sodium hydroxide solution is greater than about 1 molar.

8. The method for hydrolyzing biological material of claim 7, wherein the concentration of approximately 3 molar.

9. The method for hydrolyzing biological material of claim 1, wherein the quantity of alkaline solution chosen is effective for achieving liquefaction of said biological material when diluted with water from the biological material.

\* \* \* \* \*